3,388,125
17α-ALKYL-17β-METHYL-3-OXO-13ξ-GONENE EPOXIDES AND INTERMEDIATES

Edward A. Brown, Wilmette, Ill., assignor to G. D. Searle & Co., Chicago, Ill., a corporation of Delaware
No Drawing. Filed Aug. 22, 1966, Ser. No. 573,810
11 Claims. (Cl. 260—239.55)

This invention relates to 17α-alkyl-17β-methyl-3-oxo-13ξ-gonene expoxides and intermediates, and to processes for the preparation thereof. The 17α-alkyl grouping referred to is either ethyl or propyl; and the epoxide linkage connects the omega carbon atom therein with either carbon atom number 13 or carbon atom number 14 in the gonene nucleus, via hydrogen replacement. Configuration of the nuclear terminus of the epoxide linkage is always alpha; configuration of the hydrogen at carbon atom number 13 in the 14α-oxy compounds hereof is unknown. The double bond called for is either 4 or 5(10), a methyl group being optional at carbon atom number 10 of the 4-enes.

It follows from the above that the 17α-alkyl-17β-methyl-3-oxo-13ξ-gonene epoxides of this invention, though intimately interrelated, are variously enformulated thus

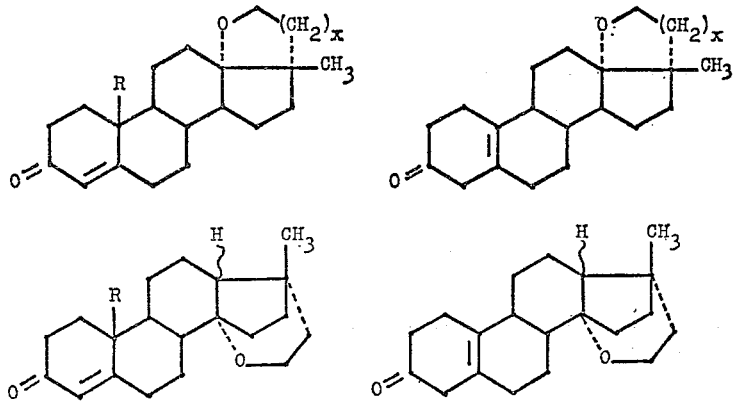

where R represents hydrogen or the methyl radical and $x$ represents a positive integer less than 3.

The compounds to which this invention relates are useful by reason of their valuable pharmacological properties and, in the case of intermediates, the fact that they afford access to compounds so characterized. For example, the subject compounds are estrogen antagonists, progestational, and adapted to counteract the inflammatory response to tissue insult. The compounds are also antibiotics effective against *Tetrahymena gelleii*, *Trichophyton mentagrophytes*, *Candida albicans*, *Chlorella vulgaris*, and Dicotyledoneae.

The 10-unsubstituted compounds of this invention (R=H) are prepared from an appropriate estratrienetriol methyl ether

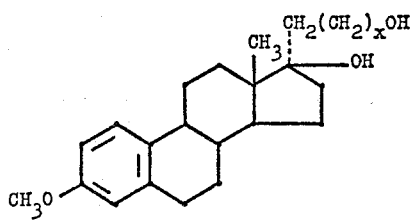

($x$ being defined as before) by heating it with concentrated hydrochloric acid in ethanol to give the corresponding 13α-epoxy intermediate triene

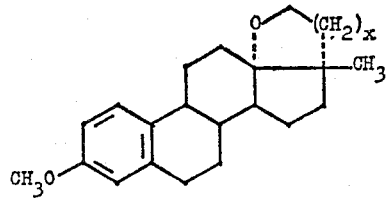

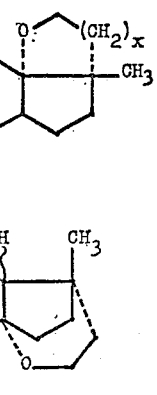

mixed, when $x$ is 1, with the 14α-epoxy intermediate triene

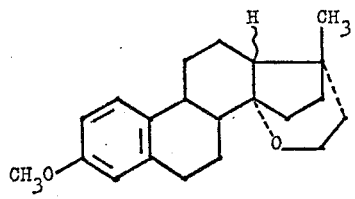

The mixture is separated by chromatography. From the epoxy intermediate trienes, on Birch reduction with lithium and liquid ammonia in tetrahydrofuran containing tertbutyl alcohol, the corresponding intermediate dienes

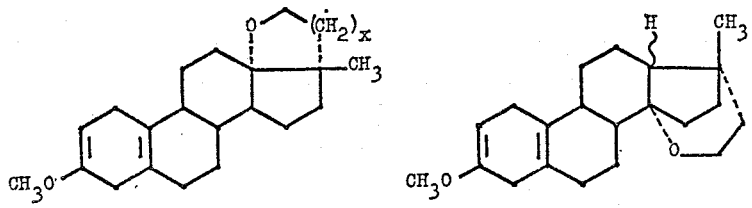

are obtained. The dienes are converted to the 5(10)-ene-3-ones

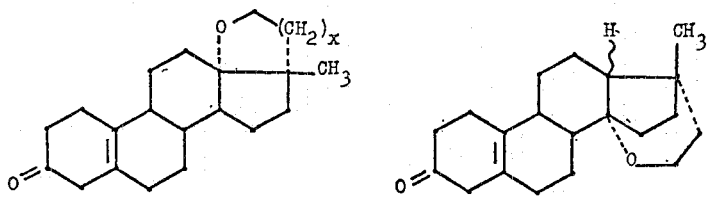

on contact with aqueous 90% acetic acid, and the corresponding 4-en-3-ones are obtained from either the dienes or the 5(10)-en-3-ones on warming with aqueous methanolic hydrogen chloride.

The 10-methyl compounds of this invention (R=CH₃) are prepared from an appropriate androstenetriol

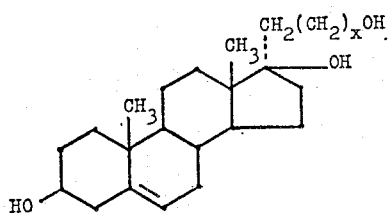

($x$ being defined as before) by heating it with concentrated hydrochloric acid in ethanol to give the corresponding 13α-epoxy intermediate 5-en-3-ol

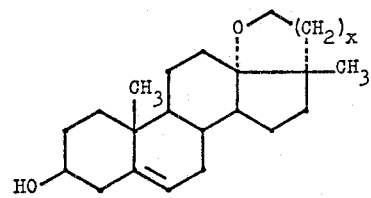

mixed, when $x$ is 1, with the 14α-epoxy intermediate 5-en-3-ol

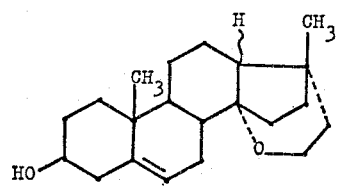

The mixture is separated by chromatography. From the 5-en-3-ols, on Oppenauer oxidation, the 4-en-3-ones are obtained. Alternatively, the androstenediolones

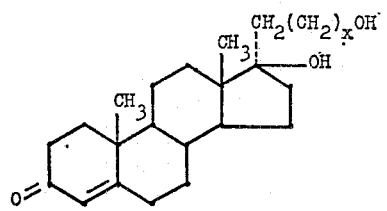

afford the epoxy 4-en-3-ones directly on heating with concentrated hydrochloric acid in ethanol.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

(A) *Ethyl 17β-hydroxy-3-methoxyestra-1,3,5(10) - trien-17α-ylacetate.*—A mixture of 10 parts of 3-methoxyestra-1,3,5(10)-trien-17-one, 22 parts of ethyl bromoacetate, 14 parts of 20-mesh zinc, and 88 parts of benzene is stirred at the boiling point under reflux for 2 hours, then chilled. Zinc is filtered out and washed with benzene, the wash liquor being added to the filtrate. The resultant solution is stirred into an ice-cold mixture of 24 parts of concentrated hydrochloric acid and 500 parts of water, whereupon the benzene phase is separated and the aqueous phase extracted with ether. The ether and benzene solutions are combined, washed with water, dried over anhydrous sodium sulfate, and stripped of solvent by vacuum distillation. The oily residue, together with 8 parts of glacial acetic acid and 8 parts of (carboxymethyl)trimethylammonium chloride hydrazide is heated at the boiling point under reflux for 30 minutes. The resultant solution is mixed with 12 parts of sodium bicarbonate dissolved in 400 parts of water. The precipitate thrown down is filtered off, washed with water, dried in air, and recrystallized from methanol to give ethyl 17β-hydroxy-3-methoxyestra-1,3,5(10) - trien - 17α - ylacetate melting at 102–104°.

(B) *17β-hydroxy - 17α - (2-hydroxyethyl)-3-methoxyestra-1,3,5(10)-triene.*—To a suspension of 21 parts of lithium aluminum hydride in 890 parts of tetrahydrofuran is added, during 15 minutes with agitation, a solution of 105 parts of ethyl 17β-hydroxy-3-methoxyestra-1,3,5(10)-trien-17α-ylacetate in 890 parts of tetrahydrofuran. The resultant mixture is heated at the boiling point under reflux with continued agitation for 4 hours, then hydrolyzed by slowly incorporating therein a solution of 20 parts of water in 20 parts of tetrahydrofuran, followed by 50 parts of water. Insoluble solids are filtered off and washed with tetrahydrofuran. The wash liquor is added to the filtrate, and the resultant solution is mixed with 10,000 parts of cold water. The precipitate thrown down is filtered off, washed with water, dried in air, and recrystallized from methanol to give 17β-hydroxy-17α-(2-hydroxyethyl)-3-methoxyestra-1,3,5(10)-triene melting at approximately 161°.

(C) *13,17²-epoxy-17α-ethyl-3-methoxy - 17β - methyl-13α-gona-1,3,5(10)-triene and 14,17²-epoxy - 17α - ethyl-3-methoxy-17β-methyl-13ξ-gona - 1,3,5(10) - triene.*—A suspension of 101 parts of 17β-hydroxy-17α-(2-hydroxyethyl)-3-methoxyestra-1,3,5(10)-triene in 119 parts of concentrated hydrochloric acid and 320 parts of ethanol is heated at the boiling point with agitation under reflux for 45 minutes, whereupon 1760 parts of benzene is mixed in. The benzene phase is separated, washed thoroughly with water, dried over anhydrous sodium sulfate, and stripped of solvent by vacuum distillation. The oily residue is chromatographed on silica gel, using benzene and ethyl acetate as developing solvents. From the initial eluate comprising 1% ethyl acetate in benzene, on evaporation of solvent and recrystallization of the residue from hexane, 14,17²-epoxy-17α-ethyl-3-methoxy-17β-methyl-13ξ - gona-1,3,5(10)-triene melting at 76–85° is obtained. Subsequent eluates comprising 1% ethyl acetate in benzene afford, on evaporation of solvent and recrystallization of the residue from hexane, 13,17²-epoxy-17α-ethyl-3-methoxy-17β-methyl-13α - gona - 1,3,5(10) - triene melting at 60–61°.

(D) *13,17²-epoxy-17α-ethyl - 3 - methoxy-17β-methyl-13α-gona-2,5(10)-diene.*—To a solution of 24 parts of 13,17² - epoxy-17α-ethyl-3-methoxy-17β-methyl-13α-gona-1,3,5(10)-triene in 668 parts of tetrahydrofuran, 585 parts of tert-butyl alcohol, and 1020 parts of liquid ammonia is added 16 parts of lithium wire cut in 1-cm. pieces. A blue color develops. The resultant mixture is stirred vigorously for 2 hours, whereupon 64 parts of methanol is cautiously introduced. Approximately 1 hour later (when the reaction mixture is colorless), ammonia is allowed to evaporate. After 2 hours, 3000 parts of water is mixed in. The resultant 2-phase mixture is vacuum distilled until an oil separates. The oil is extracted with a mixture of 90 parts of ethyl acetate and 990 parts of hexane. The extract is washed with water, dried over anhydrous sodium sulfate, and stripped of solvent by vacuum distillation. The residual oil is 13,17² - epoxy-17α-ethyl-3-methoxy-17β-methyl-13α-gona-2,5(10)-diene.

(E) *13,17² - epoxy - 17α-ethyl-17β-methyl-13α-gon-5(10)-en-3-one.*—A solution of 23 parts of 13,17²-epoxy-17α - ethyl - 3-methoxy-17β-methyl-13α-gona-2,5(10)-diene in 500 parts of aqueous 90% acetic acid is allowed to stand at room temperature for 1½ hours, then filtered. The filtrate is diluted with 2000 parts of water. The oil which separates is extracted with hexane. The hexane extract is washed with water, dried over anhydrous sodium sulfate, and stripped of solvent by vacuum distillation. The oily residue is 13,17²-epoxy-17α-ethyl-17β-methyl-13α-gon-5(10)-en-3-one.

(F) *13,17² - epoxy - 17α-ethyl-17β-methyl-13α-gon-5(10)-en-3-one.*—A solution of 16 parts of 13,17²-epoxy-17α-ethyl-17β-methyl-13α-gon-5(10)-en-3-one in a mixture of 13 parts of concentrated hydrochloric acid, 11 parts of water, and 128 parts of methanol is allowed to stand at room temperature for 2 hours, then filtered. The filtrate is diluted with 1250 parts of water. An oil separates and solidifies on chilling. The solid product is filtered off, washed with water, dried in air, and recrystallized from a mixture of ethyl acetate and hexane to give 13,17² - epoxy-17α-ethyl-17β-methyl-13α-gon-4-en-3-one melting at 84–87°. The product has the formula

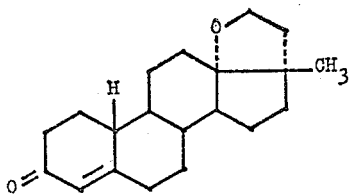

Example 2

(A) *14,17² - epoxy - 17α-ethyl-3-methoxy-17β-methyl-13ξ-gona-2,5(10α-diene.*—To a solution of 30 parts of 14,17² - epoxy-17α-ethyl-3-methoxy-17β-methyl-13ξ-gona-1,3,5(10)-triene in 810 parts of tetrahydrofuran, 720 parts of tert-butyl alcohol, and 1224 parts of liquid ammonia is added 18 parts of lithium wire cut in small pieces. After 3 hours of vigorous stirring, 48 parts of methanol is cautiously introduced. Approximately 30 minutes later, the characteristic blue color initially developed disappears. Ammonia is thereupon allowed to evaporate during 16 hours, following which 1800 parts of water is mixed in. The resultant mixture is concentrated by vacuum distillation until an oil precipitates, at which point it is chilled. The oil solidifies to a tacky mass which is filtered off, washed with water, and taken up in hexane. The hexane solution is dried over anhydrous sodium sulfate and stripped of solvent by vacuum distillation. The residual oil is 14,17²-epoxy-17α-ethyl-3-methoxy-17β-methyl-13ξ-gona-2,5(10)-diene.

(B) *14,17²-epoxy-17α-ethyl-17β-methyl-13ξ-gon-5(10)-en-3-one.*—A solution of 11 parts of 14,17²-epoxy-17α-ethyl - 3-methoxy-17β-methyl-13ξ-gona-2,5(10)-diene in 220 parts of aqueous 90% acetic acid is allowed to stand at room temperature for 1½ hours, then diluted with 1000 parts of water. The solid precipitate thrown down is filtered off, washed with water, dried in air, and recrystallized from hexane to give 14,17²-epoxy-17α-ethyl-17β-methyl-13ξ-gon-5(10)-en-3-one melting at 132–135°.

(C) *14,17² - epoxy - 17α-ethyl-17β-methyl-13ξ-gon-4-en-3-one.*—A suspension of 9 parts of 14,17²-*epoxy-17α-ethyl-17β-methyl-13ξ-gon-5(10)-en-3-one* in approximately 8 parts of concentrated hydrochloric acid, 7 parts of water, and 100 parts of methanol is stirred and warmed to 50°, whereupon stirring is continued at ambient temperatures for 1 hour. The resultant mixture is allowed to stand without stirring for 1 hour. Insoluble solids are thereupon filtered off, washed with methanol, and recrystallized from methanol to give 14,17²-epoxy-17α-ethyl-17β-methyl-13ξ-gon-4-en-3-one melting at 181–186°. The product has the formula

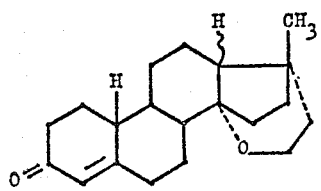

Example 3

(A) *13,17²-epoxy-17α-ethyl-10,17β-dimethyl-13α-gon-5-en-3β-ol and 14,17²-epoxy-17α-ethyl-10,17β-dimethyl-13ξ-gon-5-en-3β-ol.*—A suspension of 155 parts of 3β,17β-dihydroxy-17α-(2-hydroxyethyl)androst-5-ene [J. Chem. Soc., 1950, 2393] in approximately 180 parts of concentrated hydrochloric acid and 480 parts of ethanol is heated at the boiling point under reflux with agitation for 1 hour and 40 minutes. Solution occurs. Approximately 1500 parts of water is introduced, precipitating a tacky solid which is filtered off, washed with water, dried in air, and extracted by digestion with 450 parts of boiling ethyl acetate. The extract is chilled, then filtered. The filtrate is freed of solvent by vacuum distillation; and the residue is chromatographed on silica gel, using benzene and ethyl acetate as developing solvents. From an eluate comprising 10% ethyl acetate in benzene, on evaporation of solvent and recrystallization of the residue from ethanol, 14,17² - epoxy - 17α-ethyl - 10,17β - dimethyl - 13ξ-gon-5-en-3β-ol melting at 212–215° is obtained. An eluate comprising 15% ethyl acetate in benzene is stripped of solvent by vacuum distillation, whereupon the residue is again chromatographed on silica gel using benzene and ethyl acetate as developing solvents. From an eluate comprising 10% ethyl acetate in benzene, on evaporation of solvent and recrystallization of the residue from a mixture of ethyl acetate and hexane, 13,17²-epoxy-17α-ethyl-10,17β-dimethyl-13α-gon-5-en-3β-ol melting at 48–53° is obtained.

(B) *13,17²-epoxy-17α-ethyl-10,17β-dimethyl-13α-gon-4-en-3-one.*—To a solution of 100 parts of 13,17²-epoxy-17α-ethyl-10,17β-dimethyl-13α-gon-5-en-3β-ol in 3600 parts of toluene and 650 parts of cyclohexanone at the boiling point under reflux in a nitrogen atmosphere is added, with agitation, a solution of 95 parts of aluminum isopropoxide in 1350 parts of toluene. Boiling under reflux in nitrogen with agitation is continued for 30 minutes, whereupon the reaction mixture is cooled to room temperature and hydrolyzed thereat by introduction of 456 parts of a saturated aqueous solution of Rochelle salt. Nonaqueous solvent is removed by steam distillation, whereupon the distillant is cooled to 5°. A solid precipitates. The precipitate is filtered off, washed with water, dried in air, and recrystallized from ethyl acetate to give 13,17²- epoxy - 17α - ethyl - 10,17β - dimethyl-13α-gon-4-en-3-one melting at 144–150°. The product has the formula

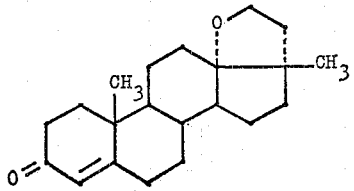

Example 4

*14,17²-epoxy-17α-ethyl-10,17β-dimethyl-13ξ-gon-4-en-3 one.*—Substitution of 95 parts of 14,17²-epoxy-17α-ethyl-10,17β-dimethyl-13ξ-gon-5-en-3β-ol and 432 parts of a saturated aqueous solution of Rochelle salt for the 100 parts of 13,17²-epoxy-17α-ethyl-10,17β-dimethyl-13α-gon-5-en-3β-ol and 456 parts of a saturated aqueous solution of Rochelle salt called for, respectively, in Example 3B affords, by the procedure there detailed, 14,17²-epoxy-17α-ethyl-10,17β-dimethyl-13ξ-gon-4-en-3-one melting at 129–134°. The product has the formula

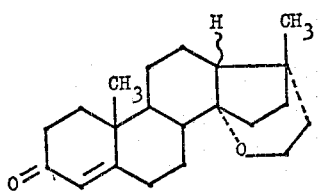

Example 5

(A) *13,17³-epoxy-3-methoxy-17β-methyl-17α-propyl-13α-gona-1,3,5(10)-triene.*—A suspension of 176 parts of 17β-hydroxy-17α-(3-hydroxypropyl)-3 - methoxyestra - 1, 3,5(10)-triene in 560 parts of ethanol and approximately 180 parts of concentrated hydrochloric acid is heated at the boiling point under reflux with agitation for 45 minutes, during which the steroid dissolves and an oily layer forms. Approximately 2500 parts of water is stirred in, and the resultant mixture is refrigerated at 5° for 16 hours. The waxy solid which eventuates is filtered out, and the filtrate is stripped of solvent by vacuum distillation. The residue is chromatographed on silica gel, using benzene and ethyl acetate as developing solvents. Eluates comprising 5% ethyl acetate in benzene are pooled and stripped of solvent by vacuum distillation. The residue is chromatographed on silica gel, again using benzene and ethyl acetate as developing solvents; and eluates comprising 1% ethyl acetate in benzene are pooled and stripped of solvent by vacuum distillation. The residue thus obtained, recrystallized from ethyl acetate, affords 13,17³-epoxy - 3-methoxy-17β-methyl-17α-propyl-13α-gona-1,3,5 (10)-triene melting at 85–91°.

(B) *13,17³-epoxy-3-methoxy-17β-methyl-17α - propyl-13α-gona-2,5(10)-diene.*—To a solution of 87 parts of 13,17³-epoxy-3-methoxy-17β-methyl - 17α - propyl - 13α-gona-1,3,5(10)-triene in 2250 parts of tetrahydrofuran, 3400 parts of liquid ammonia, and 2000 parts of tert-butyl alcohol is added 50 parts of lithium wire cut in small pieces. A characteristic blue color develops. The reaction mixture is stirred vigorously for approximately 3 hours, at which point the blue color is discharged by cautiously mixing in 160 parts of methanol and stirring the resultant mixture for 30 minutes. Ammonia is thereupon evaporated during 1 hour, at which point 6000 parts of water is introduced; and non-aqueous solvents are then removed by vacuum distillation. Insoluble solids are separated from the residual suspension by filtration. The product thus isolated is 13,17³-epoxy-3-methoxy-17β-methyl-17α-propyl-13α-gona-2,5(10)-diene.

(C) *13,17³ - epoxy - 17β - methyl-17α-propyl-13α-gon-5(10)-en-3-one.*—Substitution of 11 parts of 13,17³-epoxy-3-methoxy-17β-methyl - 17α - propyl - 13α - gona-2,5(10)-diene for the 14,17²-epoxy - 17α-ethyl-3-methoxy-17β-methyl-13ξ-gona-2,5(10)-diene called for in Example 2B affords, by the procedure there detailed, 13,17³-epoxy-17β-methyl-17α-propyl-13α-gon-5(10)-en-3-one.

(D) *13,17³-epoxy-17β-methyl - 17α - propyl - 13α-gon-4-en-3-one.*—Substitution of 16 parts of 13,17³-epoxy-17β-methyl-17α-propyl-13α-gon-5(10)-en-3-one for the 13,17²-epoxy - 17α - ethyl-17β-methyl-13α-gon-5(10)-en-3-one called for in Example 1F and recrystallization of the product from ethyl acetate alone rather than a mixture of ethyl acetate and hexane affords, by a procedure otherwise identical with that detailed in Example 1F, 13,17³ - epoxy - 17β-methyl-17α-propyl-13α-gon-4-en-3-one melting at approximately 88–89°. The product has the formula

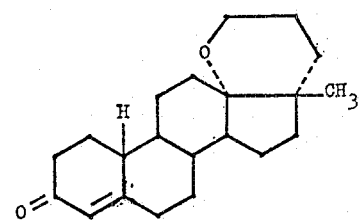

Example 6

*13,17³ - epoxy - 10,17β-dimethyl-17α-propyl-13α-gon-5-en-3β-ol.*—A suspension of 15 parts of 3β,17β-dihydroxy-17α-(3-hydroxypropyl)androst - 5 - ene [J. Org. Chem., 26, 3077 (1961)] in 18 parts of concentrated hydrochloric acid and 48 parts of ethanol is heated at the boiling point under reflux with agitation for 2 hours, during which the steroid dissolves. The reactants are thereupon mixed with 400 parts of water, causing precipitation of a tacky solid which is filtered off, dried in air, and taken up in 54 parts of boiling ethyl acetate. The ethyl acetate solution is chilled to 5° and then filtered. The filtrate is stripped of solvent by vacuum distillation; and the residue is chromatographed on silica gel, using benzene and ethyl acetate as developing solvents. From an eluate comprising 10% ethyl acetate in benzene, on evaporation of solvent, 13,17³-epoxy-10,17β-dimethyl-17α-propyl-13α-gon-5-en-3β-ol is obtained as the residue.

Example 7

*13,17³ - epoxy - 10,17β-dimethyl-17α-propyl-13α-gon-4-en-3-one.*—A solution of 4 parts of 17β-hydroxy-17α-(3-hydroxypropyl)androst-4-en-3-one [J. Med. Chem., 6, 617 (1933)] and 2 parts of p-toluenesulfonic acid monohydrate in 252 parts of toluene is heated at the boiling point under reflux for 30 minutes, then washed well with water, dried over anhydrous sodium sulfate, and stripped of solvent by vacuum distillation. The residual oil is chromatographed on silica gel, using benzene and ethyl acetate as developing solvents. From an eluate comprising 10% ethyl acetate in benzene, on evaporation of solvent and recrystallization of the residue from hexane, 13,17³ - epoxy - 10,17β-dimethyl-17α-propyl-13α-gon-4-en-3-one melting at 99–104° is obtained. The product has the formula

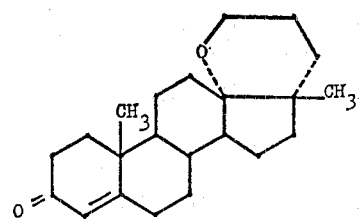

What is claimed is:
1. A compound selected from the group consisting of compounds of the formula

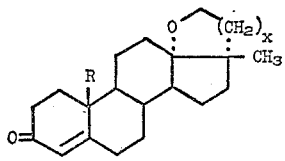

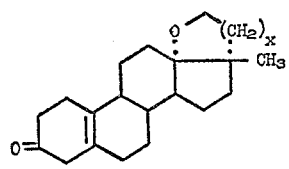

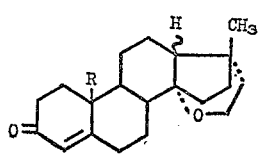

and

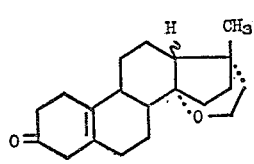

wherein R represents hydrogen or the methyl radical and x represents a positive integer less than 3.

2. A compound according to claim 1 which is 13,17²-epoxy-17α-ethyl-17β-methyl-13α-gon-4-en-3-one.
3. A compound according to claim 1 which is 13,17²-epoxy-17α-ethyl-17β-methyl-13α-gon-5(10)-en-3-one.
4. A compound according to claim 1 which is 14,17²-epoxy-17α-ethyl-17β-methyl-13ξ-gon-4-en-3-one.
5. A compound according to claim 1 which is 14,17²-epoxy-17α-ethyl-17β-methyl-13ξ-gon-5(10)-en-3-one.

6. A compound having the formula

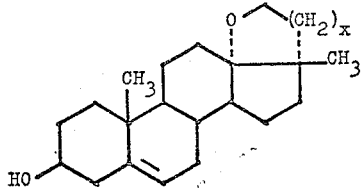

wherein x represents a positive integer less than 3.

7. 14,17² - epoxy - 17α-ethyl-10,17β-dimethyl-13ξ-gon-5-en-3β-ol.

8. A compound having the formula

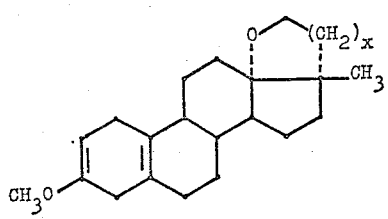

wherein x represents a positive integer less than 3.

9. 14,17² - epoxy - 17α-ethyl-3-methoxy-17β-methyl-13ξ-gona-2,5(10)-diene.

10. A compound having the formula

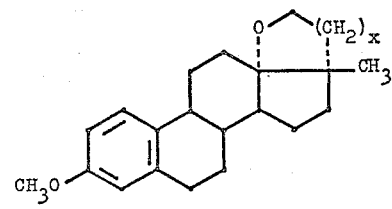

wherein x represents a positive integer less than 3.

11. 14,17² - epoxy - 17α-ethyl-3-methoxy-17β-methyl-13ξ-gona-1,3,5(10)-triene.

References Cited
UNITED STATES PATENTS
3,354,153  11/1967  Karmas _____ 260—239.55

ELBERT L. ROBERTS, *Primary Examiner.*